(12) United States Patent
Jang et al.

(10) Patent No.: US 12,499,821 B2
(45) Date of Patent: Dec. 16, 2025

(54) DISPLAY DEVICE AND METHOD OF DRIVING THE SAME

(71) Applicant: SAMSUNG DISPLAY CO., LTD., Yongin-si (KR)

(72) Inventors: Ji-Eun Jang, Yongin-si (KR); Wonbok Lee, Yongin-si (KR); Gunhee Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/659,822

(22) Filed: May 9, 2024

(65) Prior Publication Data

US 2024/0379053 A1 Nov. 14, 2024

(30) Foreign Application Priority Data

May 12, 2023 (KR) .......................... 10-2023-0061591

(51) Int. Cl.
*G09G 3/20* (2006.01)
*G06T 5/92* (2024.01)
(Continued)

(52) U.S. Cl.
CPC ............. *G09G 3/3208* (2013.01); *G06T 5/92* (2024.01); *G09G 3/2003* (2013.01);
(Continued)

(58) Field of Classification Search
CPC ....... G09G 2320/0666; G09G 2340/06; G09G 5/02; G09G 2320/0242; G09G 3/3607;
(Continued)

(56) References Cited

U.S. PATENT DOCUMENTS 10,235,779 B2 * 3/2019 Min ........................ H04N 1/60
11,205,399 B2 * 12/2021 Tsukada ................... G09G 5/06
(Continued)

FOREIGN PATENT DOCUMENTS

KR   10-0791387    12/2007
KR   10-1321396    10/2013
(Continued)

OTHER PUBLICATIONS

Shiga, et al., "Power Reduction of OLED Displays by Tone Mapping Based on Helmholtz—Kohlrausch Effect", IEICE Trans. Electron., vol. E100-C, No. 11 Nov. (2017), pp. 1026-1030.

*Primary Examiner* — Dismery Mercedes
(74) *Attorney, Agent, or Firm* — F. Chau & Associates, LLC (57) ABSTRACT

A display device divides a display panel into a skin region and a non-skin region different from the skin region based on input image data, calculates a saturation weight of the skin region and a saturation weight of the non-skin region, calculates the saturation weight of the non-skin area based on the input image data, and calculates a value weight and a hue weight based on the input image data. The saturation compensation value is determined based on a saturation value of the input image data, the saturation weight, the value weight, and the hue weight, and a value compensation value is determined based on a value value of the input image data. The input image data is compensated based on the saturation compensation value and the value compensation value.

20 Claims, 7 Drawing Sheets

(51) Int. Cl.
*G09G 3/3208* (2016.01)
*G09G 5/02* (2006.01)

(52) U.S. Cl.
CPC ............ *G09G 3/2096* (2013.01); *G09G 5/02* (2013.01); *G09G 2320/0233* (2013.01); *G09G 2320/0242* (2013.01); *G09G 2320/0626* (2013.01); *G09G 2320/0666* (2013.01); *G09G 2320/0686* (2013.01); *G09G 2330/021* (2013.01); *G09G 2340/06* (2013.01); *G09G 2360/16* (2013.01)

(58) Field of Classification Search
CPC ....... G09G 2360/16; G09G 2320/0626; G09G 2320/066; G09G 3/2003; G09G 2320/0673; G09G 3/2096; G09G 3/3208; G09G 2320/02; G09G 2320/0233; G09G 2320/0686; G09G 3/04845; G09G 3/3426; G06T 2207/10016; G06T 2207/30088; G06T 11/001; G06T 2207/10024; G06T 7/90; G06T 2207/20021; G06T 7/11
See application file for complete search history.

(56) References Cited

U.S. PATENT DOCUMENTS

| 2009/0290068 | A1* | 11/2009 | Abe | H04N 9/3182 |
| | | | | 348/E9.037 |
| 2010/0158357 | A1* | 6/2010 | Hung | H04N 1/62 |
| | | | | 382/162 |
| 2010/0160049 | A1* | 6/2010 | Oku | A63F 13/10 |
| | | | | 463/43 |
| 2011/0187735 | A1* | 8/2011 | Kondoh | H04N 9/68 |
| | | | | 345/589 |
| 2011/0193877 | A1* | 8/2011 | Lin | G09G 5/02 |
| | | | | 345/603 |
| 2014/0118423 | A1* | 5/2014 | Hasegawa | G09G 3/2074 |
| | | | | 345/88 |
| 2014/0306985 | A1* | 10/2014 | Jeong | G06F 1/1652 |
| | | | | 345/600 |
| 2015/0256760 | A1* | 9/2015 | Ju | H04N 23/76 |
| | | | | 348/256 |
| 2018/0089856 | A1* | 3/2018 | Sato | H04N 1/62 |
| 2018/0226032 | A1* | 8/2018 | Kim | G09G 3/3406 |
| 2019/0214519 | A1* | 7/2019 | Chen | H10F 77/1692 |
| 2019/0215419 | A1* | 7/2019 | Chen | G06T 5/94 |

FOREIGN PATENT DOCUMENTS

| KR | 10-2014-0101246 | 8/2014 |
| KR | 10-2017-0117287 | 10/2017 |
| KR | 10-2018-0062129 | 6/2018 |
| KR | 10-1927862 | 12/2018 |
| KR | 10-2019-0079921 | 7/2019 |
| KR | 10-2023-0139910 | 10/2023 |

* cited by examiner

DISPLAY DEVICE AND METHOD OF DRIVING THE SAME

This application claims priority under 35 USC § 119 to Korean Patent Application No. 10-2023-0061591, filed on May 12, 2023, in the Korean Intellectual Property Office (KIPO), the entire disclosure of which is incorporated by reference herein.

BACKGROUND

1. Field

Embodiments of the present inventive concept relate to a display device and a method of driving the same.

2. Description of the Related Art

Generally, a display device may include a display panel and a display panel driver. The display panel may include gate lines, data lines, and pixels. The display panel driver may include a gate driver for providing gate signals to the gate lines, a data driver for providing data voltages to the data lines, and a driving controller for controlling the gate driver and the data driver.

Each of the pixels may emit light with a luminance corresponding to a driving current. The driving current may be determined based on a data voltage. The data voltage may be reduced to reduce power consumption of the display device. However, when the data voltage decreases, the luminance may decrease and visibility may decrease. As a result, visual luminance perceived by the user may decrease.

SUMMARY

One or more embodiments of the present inventive concept provide a display device which reduces power consumption while maintaining visual luminance.

One or more embodiments may maintain visual luminance by increasing saturation as luminance decreases to offset the reduction in luminance.

One or more embodiments may reduce power consumption by reducing data voltages of the display device.

One or more embodiments of the present inventive concept provide a method of driving the display device.

In an embodiment of a display device according to the present inventive concept, the display device comprises a display panel including pixels, a driving controller configured to receive input image data for the display panel, to divide the display panel into a skin region and a non-skin region different from the skin region based on the input image data, to calculate a saturation weight of the skin region and a saturation weight of the non-skin region, to calculate a value weight and a hue weight based on the input image data, to determine a saturation compensation value based on a saturation value of the input image data, the saturation weight, the value weight, and the hue weight and a value compensation value based on a value value of the input image data, and to compensate for the input image data based on the saturation compensation value and the value compensation value to output a data signal, and a data driver configured to provide data voltages to pixels based on the data signal.

In an embodiment, when the value compensation value decreases, the saturation compensation value may increase.

In an embodiment, the driving controller may be configured to convert the input image data into a format of HSV data and to compensate for the input image data based on the format of the HSV data.

In an embodiment, the display panel may be divided into the skin region and the non-skin region based on the saturation value, the value value, and a hue value of the input image data.

In an embodiment, the saturation weight may be determined based on the saturation value.

In an embodiment, when the saturation value is less than a first reference value, the saturation weight may increase as the saturation value increases, and when the saturation value is greater than or equal to the first reference value, the saturation weight may decrease as the saturation value increases.

In an embodiment, the saturation weight of the skin region may be less than the saturation weight of the non-skin region.

In an embodiment, the hue weight may be determined based on a hue value of the input image data.

In an embodiment, when the hue value is less than a second reference value, the hue weight may increase as the hue value increases, when the hue value is greater than or equal to the second reference value and less than a third reference value, the hue weight may be constant, and when the hue value is greater than or equal to the third reference value, the hue weight may decrease as the hue value increases.

In an embodiment, the value weight may be determined based on the value value.

In an embodiment, when the value value is less than a fourth reference value, the value weight may increase as the value value increases, and when the value value is greater than or equal to the fourth reference value, the value weight may decrease as the value value increases.

In an embodiment, the saturation compensation value may increase as the saturation value increases.

In an embodiment, the saturation compensation value may be determined based on the following equation: $SCV=SV+(SW*VW*HW)*(SV-SV^2)$, where SCV is the saturation compensation value, SV is the saturation value, SW is the saturation weight, VW is the value weight, and HW is the hue weight.

In an embodiment, the value compensation value may increase as the value value increases.

In an embodiment, the value compensation value may be determined based on the following equation: $VCV=VV*(K*VV+1)$, where VCV is the value compensation value, VV is the value value, and K is a set value (where K is a number greater than −1 and less than 0).

In an embodiment of a method of driving the display device according to the present inventive concept, the method comprises dividing a display panel into a skin region and a non-skin region different from the skin region based on input image data, calculating a saturation weight of the skin region and a saturation weight of the non-skin region, calculating a value weight and a hue weight based on the input image data, determining a saturation compensation value based on a saturation value of the input image data, the saturation weight, the value weight, and the hue weight and a value compensation value based on a value value of the input image data, and outputting a data signal based on the saturation compensation value and the value compensation value to output a data signal.

In an embodiment, when the value compensation value decreases, the saturation compensation value may increase.

In an embodiment, the method may further comprise converting the input image data into a format of HSV data.

In an embodiment, the display panel may be divided into the skin region and the non-skin region based on the saturation value, the value value, and a hue value of the input image data.

In an embodiment, the saturation weight may be determined based on the saturation value.

According to the display device and the method of driving the display device according to the embodiments, the display device may divide the display panel into the skin region and the non-skin region based on the input image data, calculate the saturation weight of the skin region and the saturation weight of the non-skin region, calculate the value weight and the hue weight based on the input image data, and determine the saturation compensation value based on the saturation value of the input image data, the saturation weight, the value weight, and the hue weight and the value compensation valueV based on the value value of the input image data.

In accordance with another embodiment, a method for controlling a display device includes reducing a data voltage of a pixel of a display panel, the reduced data voltage producing a reduction in luminance of an image generated by the display panel; and increasing saturation of the display panel to offset the reduction in luminance, wherein the saturation of the display panel is increased by an amount sufficient to maintain a constant visual luminance. Increasing the saturation of the display panel may include determining a saturation compensation value based on a saturation value of input image data, a saturation weight, a value weight, and a hue weight and a value compensation value based on a value value of the input image data IMG.

Therefore, when the display device decreases luminance while increasing saturation, the visual luminance may be maintained. Accordingly, the display device may reduce the power consumption while maintaining the visual luminance. Additionally, the saturation weight may be determined based on the saturation value, the value weight VW may be determined based on the value value, and the hue weigh may be determined based on the hue value, so that the unnaturalness of the image displayed on the display panel may be reduced or minimized.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, embodiments of the present inventive concept will be described in detail with reference to the accompanying drawings.

Figure 1:
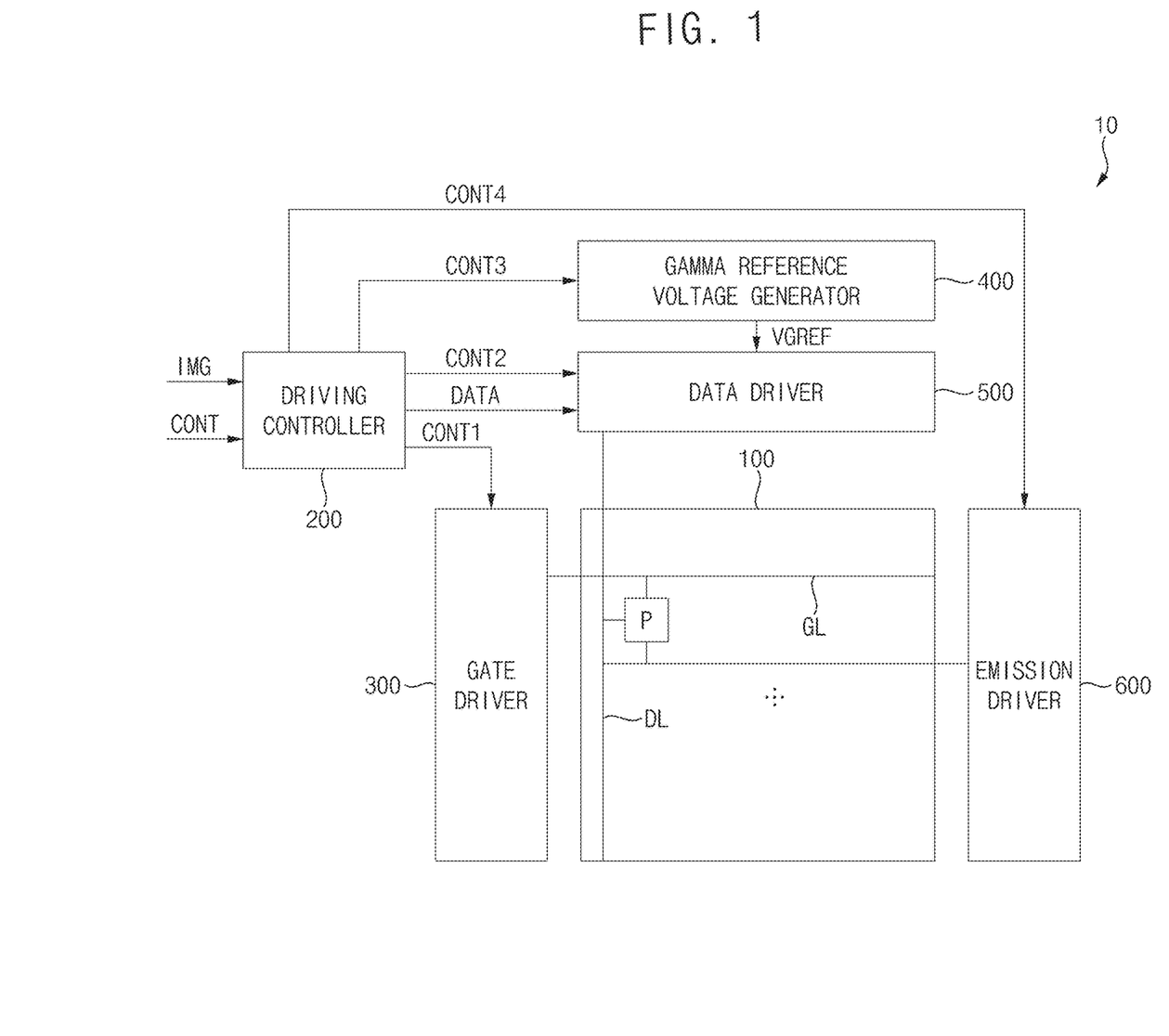
FIG. 1 is a block diagram illustrating a display device according to embodiments of the present inventive concept.

FIG. 1 is a block diagram illustrating a display device 10 according to embodiments of the present inventive concept.

Referring to FIG. 1, the display device 10 may include a display panel 100 and a display panel driver. The display panel driver may include a driving controller 200, a gate driver 300, a gamma reference voltage generator 400, a data driver 500, and an emission driver 600.

In one embodiment, the driving controller 200 and the data driver 500 may be integrally formed. In one embodiment, the driving controller 200, the gamma reference voltage generator 400, and the data driver 500 may be integrally formed. In yet another embodiment, the driving controller 200, the gate driver 300, the gamma reference voltage generator 400, and the data driver 500 and/or the emission driver 600 may be integrally formed. A driving module including at least the driving controller 200 and the data driver 500 which are integrally formed may be referred to as a timing controller embedded data driver (TED).

The display panel 100 may include a display region for displaying an image and a peripheral region disposed adjacent to the display region. For example, the display panel 100 may be an organic light emitting diode display panel including organic light emitting diodes. For example, the display panel 100 may be a quantum-dot organic light emitting diode display panel including organic light emitting diodes and quantum-dot color filters. For example, the display panel 100 may be a quantum-dot nano light emitting diode display panel including nano light emitting diodes and quantum-dot color filters.

The display panel 100 may include gate lines GL, data lines DL, and pixels P electrically connected to corresponding ones of the gate lines GL and the data lines DL. The gate lines GL may extend in a first direction D1, and the data lines DL may extend in a second direction D2 crossing the first direction D1.

The driving controller 200 may receive input image data IMG and an input control signal CONT from an external device. For example, the input image data IMG may include image data of a predetermined number of colors of light. For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT. In some embodiments, the driving controller 200 may generate a fourth control signal CONT4 for controlling the emission driver 600, as described in greater detail below.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL. In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA. In an embodiment, the gamma reference voltage generator 400 may be disposed in the driving controller 200 or the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage in analog form. The data driver 500 may output the data voltage to a corresponding one of the data line DL.

The emission driver 600 may receive the fourth control signal CONT4 and generate emission signals through emission lines EL coupled to respective ones of the pixels.

Each pixel P may emit light with a luminance corresponding to a driving current flowing through the pixel P. The driving current may be determined based on the data voltage. The data voltage may be reduced to reduce power consumption of the display device 10. However, when the data voltage decreases, luminance may decrease and visibility may decrease. In other words, a visual luminance perceived by the user may decrease.

According to a Helmholtz-Kohlrausch effect, visual luminance may increase as saturation increases at a constant luminance. Therefore, in one embodiment as luminance decreases, saturation may be increased. The saturation may be increased to increase visual luminance, to offset the reduction in luminance caused by reducing the data voltage. The saturation may be increased, for example, in order to maintain visual luminance at a substantially constant level. Accordingly, the display device 10 may reduce the power consumption while maintaining the visual luminance.

Figure 2:
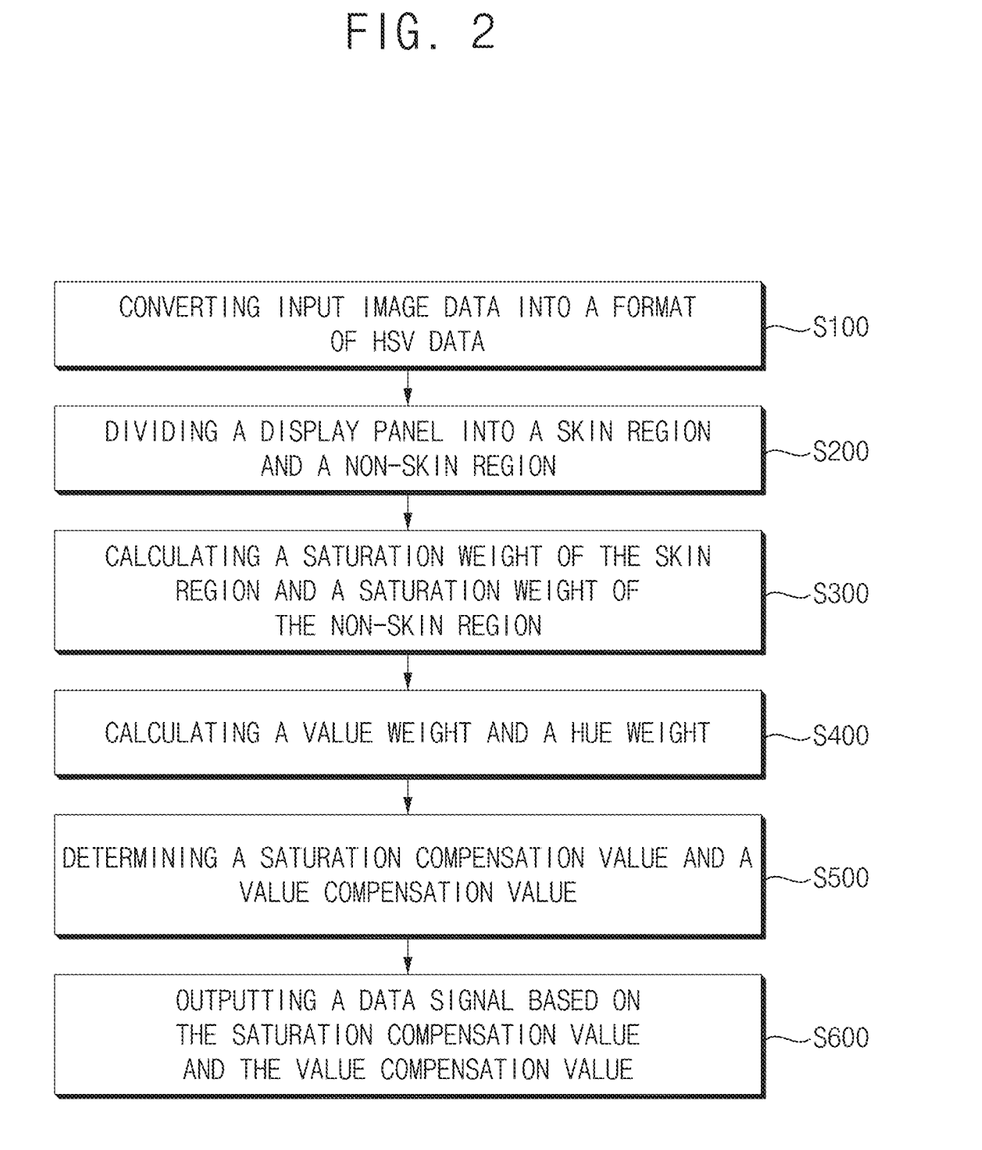
FIG. 2 is a flowchart illustrating an embodiment of a method of driving a display device.

FIG. 2 is a flowchart illustrating an embodiment of a method of driving the display device 10. Referring to FIG. 2, the method of driving display device 10 may include dividing a display panel 100 into a skin region and a non-skin region different from the skin region based on input image data IMG (S200), calculating a saturation weight of the skin region and a saturation weight of the non-skin region (S300), and calculating a value weight and a hue weight based on the input image data IMG (S400). The method may further include determining a saturation compensation value based on a saturation value of the input image data IMG, the saturation weight, the value weight, and the hue weight and a value compensation value based on a value value of the input image data IMG (S500), and outputting a data signal DATA based on the saturation compensation value and the value compensation value (S600). In an embodiment, the method of driving the display device 10 may further include, as an initial operation, converting the input image data IMG into a format of HSV data (S100). Here, the saturation value, the value value, the hue value, the saturation compensation value, and the value compensation value may be expressed as numbers between 0 and 1.

As indicated above, the method of driving the display device 10 may include converting the input image data IMG into the format of the HSV data (S100). The input image data IMG may be, for example, in a format of RGB data. The RGB data may include red image data, green image data, and blue image data. The driving controller 200 may convert the input image data IMG into the HSV data. The HSV data may include the saturation value(S), the value (V) value, and the hue value (H). In one embodiment, hue specifies the perceived color, such as red or green. Saturation specifies the intensity, or how vivid the color appears. Value specifies the brightness, or white intensity, with higher values being perceived as lighter.

Figure 3:
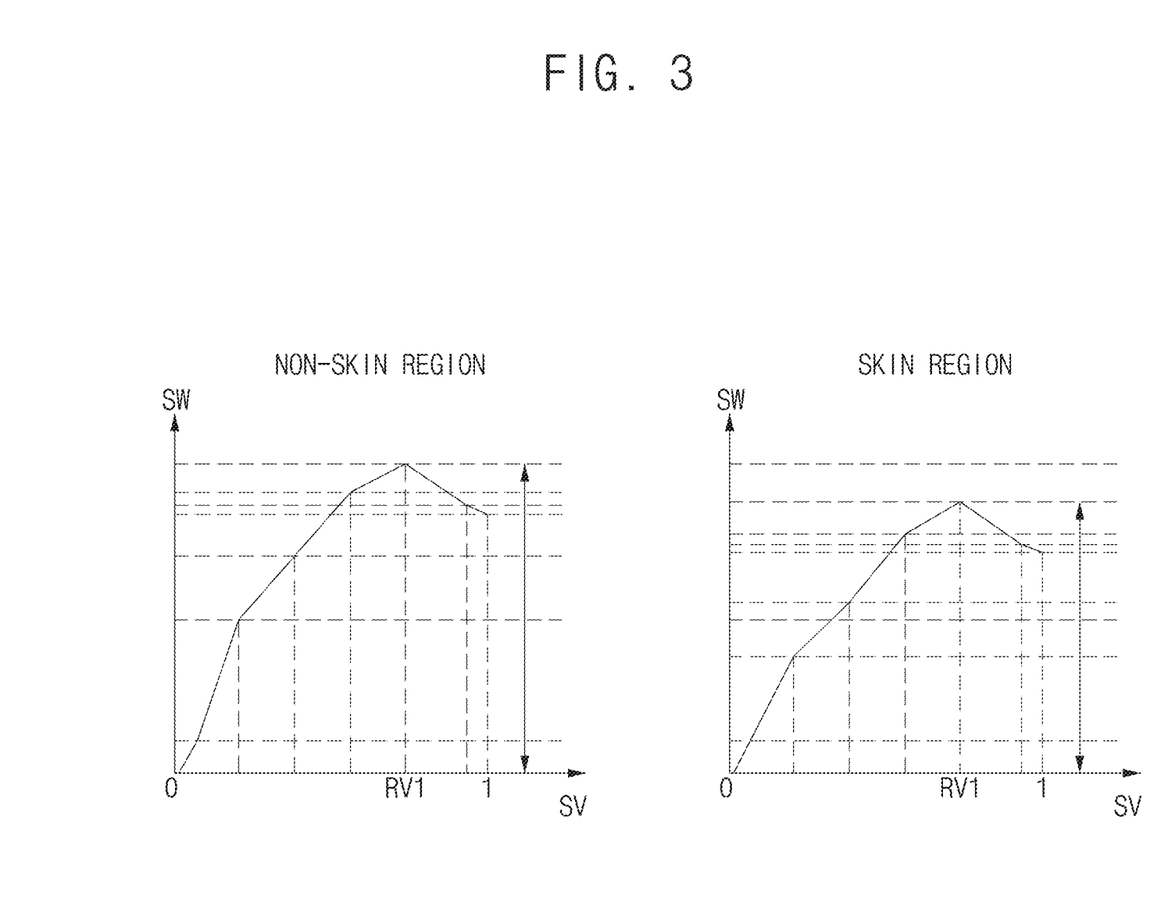
FIG. 3 is a graph illustrating a saturation weight of a skin region and a saturation weight of a non-skin region according to embodiments of the present inventive concept.

FIG. 3 is a graph illustrating a saturation weight of a skin region and a saturation weight of a non-skin region according to embodiments.

Referring to FIG. 3, the method of driving the display device 10 may include dividing the display panel 100 into the skin region and the non-skin region other than the skin region based on the input image data IMG (S200) and calculating the saturation weight SW of the skin region and the saturation weight SW of the non-skin region (S300).

In an embodiment, the display panel 100 may be divided into the skin region and the non-skin region based on the saturation value SV, the value value VV, and a hue value HV. For example, the driving controller 200 may determine the skin region based on the saturation value SV, the hue value HV, and the value value VV. The driving controller 200 may determine a display panel 100 excluding the skin region as the non-skin region. The skin region may refer to a skin color area. The saturation value SV, the hue value HV, and the value value VV for determining the skin region may be preset values. The saturation value SV, the hue value HV, and the value value VV for determining the skin region may be set differently depending on the user. The skin region may be an area which is determined to be a human skin by the driving controller 200. The non-skin region may be an area determined by the driving controller 200 to be an area other than the human skin.

The input image data IMG may include noise, and the noise may be called color noise. When the saturation value SV included in the input image data IMG are overall low (e.g., below a predetermined level), the color noise may not be visible to the user. However, when the saturation weight SW is applied to the saturation value SV, the saturation value SV may increase overall. As a result, the color noise may increase. Additionally, when a large saturation weight SW is applied to an image of an area where the saturation value SV is large, an image displayed on the display panel 100 may look unnatural. Therefore, the saturation weight SW may be determined based on the saturation value SV. For example, when the saturation value SV is less than a first reference value RV1, the saturation weight SW may increase as the saturation value SV increases. When the saturation value SV is greater than or equal to the first reference value RV1, the saturation weight SW may decrease as the saturation value SV increases. Accordingly, low saturation values SV may be slightly increased. As a result, the color noise may be reduced or maintained.

In one embodiment, the saturation weight SW of the skin region may be less than the saturation weight SW of the non-skin region. An entirety of the human skin may not be determined as the skin region. For example, when the human skin may be determined by the method described above, one part of the human skin may be determined as the skin region, and the remaining part of the human skin may be determined as the non-skin region. Therefore, when the saturation weight SW of the skin region is equal to the saturation weight SW of the non-skin region, a skin color displayed in the skin region may be distorted. For example, the skin color may turn red. Therefore, in order to reduce the degree to which the saturation value SV of the skin region is increased, the saturation weight SW of the skin region may be less than the saturation weight SW of the non-skin region.

Figure 4:
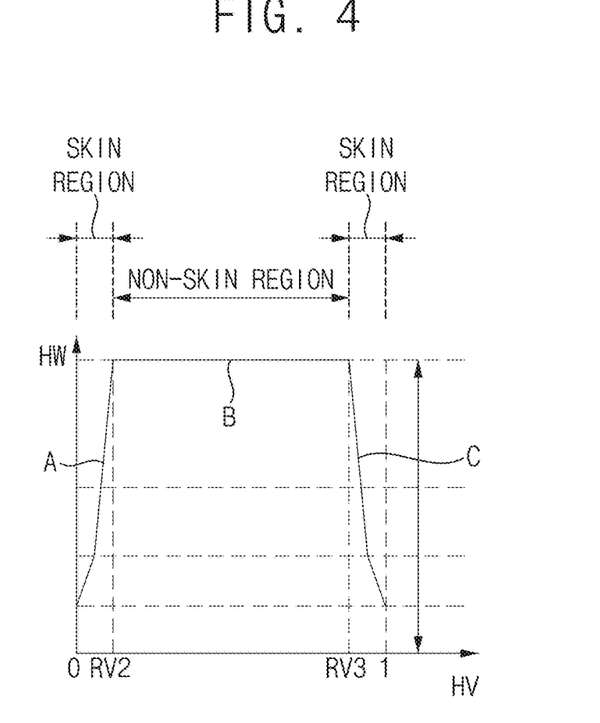
FIG. 4 is a graph illustrating a hue weight based on a hue value according to embodiments of the present inventive concept.
Figure 5:
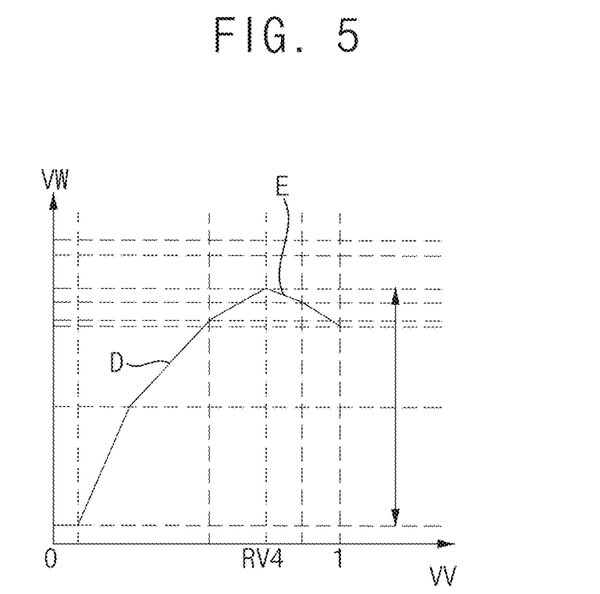
FIG. 5 is a graph illustrating a value weight based on a value value according to embodiments of the present inventive concept.

FIG. 4 is a graph illustrating a hue weight based on a hue value according to an embodiment, and FIG. 5 is a graph illustrating a value weight based on a value value according to an embodiment.

Referring to FIGS. 4 and 5, the method of driving the display device 10 may include calculating the value weight VW and the hue weight HW based on the input image data IMG (S400). When the hue value HV is expressed as an angle of 360 degrees, a color corresponding to an angle of 0 degrees may be equal to a color corresponding an angle of 360 degrees. As shown in FIG. 4, when hue value HV is expressed as a value between 0 and 1, a color corresponding to a hue value HV of 0 may be equal to a color corresponding to a hue value HV of 1. For example, a color expressed by the minimum value of the hue value HV may be equal to a color expressed by the maximum value of the hue value HV. For example, an area having a small hue value HV and an area having a large hue value HV may be the skin color.

When the saturation weight SW of the skin region is different from the saturation weight SW of the non-skin region, the skin color displayed at a boundary between the skin region and the non-skin region may be distorted. Therefore, the hue weight HW may be determined based on the hue value HV. For example, when the hue value HV is less than a second reference value RV2, the hue weight HW may increase as the hue value HV increases (see segment A in FIG. 4). When the hue value HV is greater than or equal to the second reference value RV2 and less than a third reference value RV3, the hue weight HW may be constant (see segment B in FIG. 4). The third reference value RV3 may be greater than the second reference value RV2. When the hue value HV is greater than or equal to the third reference value RV3, the hue weight HW may decrease as the hue value HV increases (see segment C in FIG. 4). Accordingly, the distortion of the skin color displayed at the boundary between the skin region and the non-skin region may be reduce or minimized.

Referring to FIG. 5, an image displayed on the display panel 100 may include an area where the value value VV is small and an area where the value value VV is large. When the value weight VW is applied to the image of the area where the value value VV is small, regardless of the value value VV, the image of the area where the value value VV is small may be lumped together. Additionally, when a large value weight VW is applied to the image of the area where the value value VV is large, the image displayed on the display panel 100 may look unnatural. Therefore, the value weight VW may be determined based on the value value VV. For example, when the value value VV is less than a fourth reference value RV4, the value weight VW may increase as the value value VV increases (see segment D in FIG. 5). When the value value VV is greater than or equal to the fourth reference value RV4, the value weight VW may decrease as the value value VV increases (see segment E in FIG. 5). Accordingly, the clumping of the image of the area where the value value VV is small and the unnaturalness of the image displayed on the display panel 100 may be reduced or minimized.

Figure 6A:
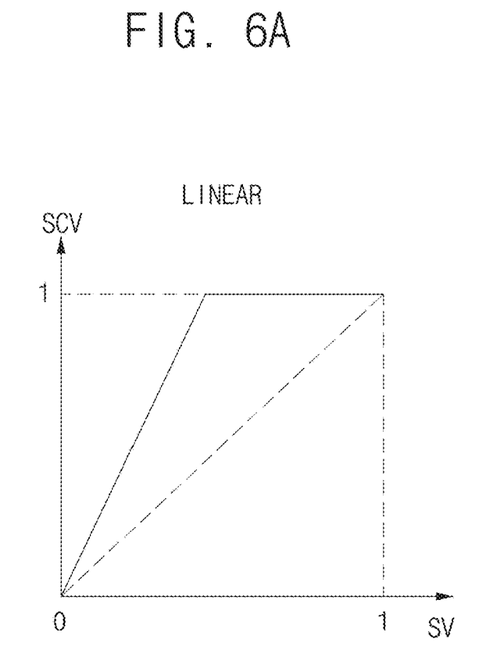
FIG. 6A is a graph illustrating a saturation compensation value SCV which is linearly compensated according to saturation value SV.
Figure 6B:
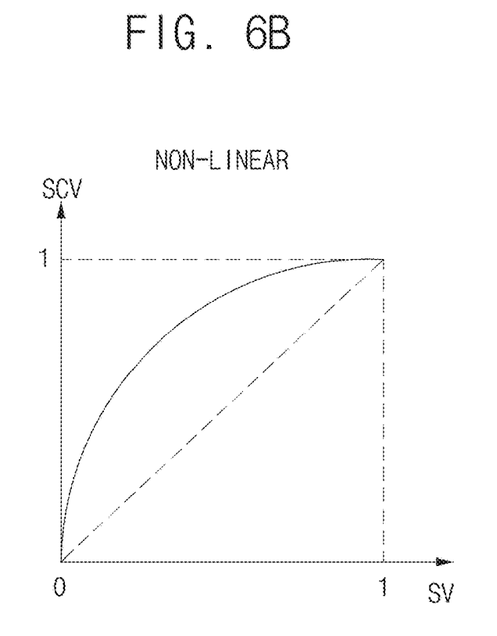
FIG. 6B illustrates prevention of oversaturation of a saturation compensation value according to embodiments of the present inventive concept.
Figure 7:
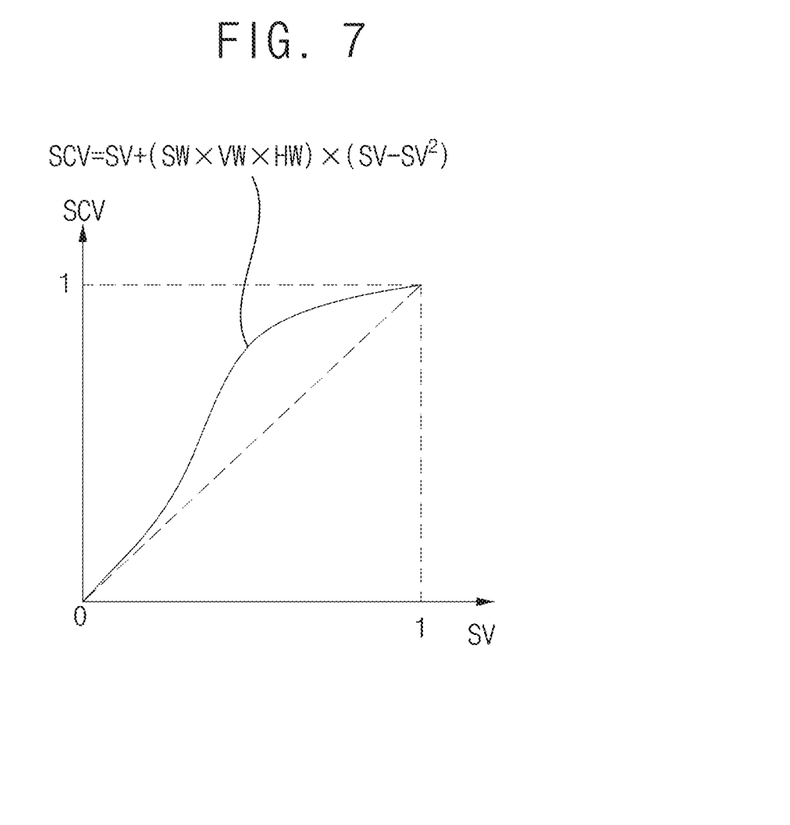
FIG. 7 is a graph illustrating a saturation compensation value according to embodiments of the present inventive concept.
Figure 8:
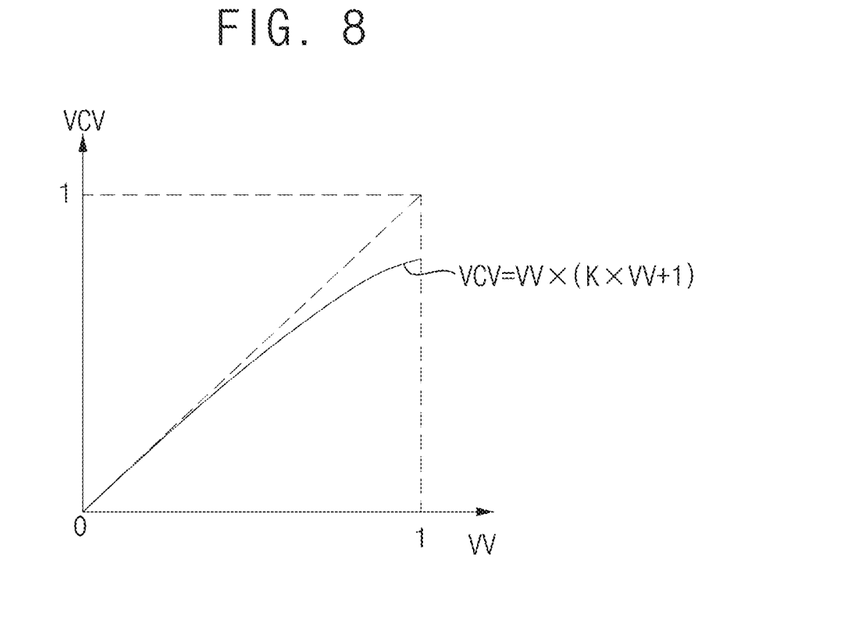
FIG. 8 is a graph illustrating value compensation value according to embodiments of the present inventive concept.

FIG. 6 is a graph illustrating prevention of oversaturation of a saturation compensation value according to an embodiment, and FIG. 7 is a graph illustrating a saturation compensation value according to an embodiment. FIG. 8 is a graph illustrating value compensation value according to an embodiment.

Referring to FIGS. 6A, 6B, 7, and 8, the method of driving the display device 10 may include determining the saturation compensation value SCV based on the saturation value SV of the input image data IMG, the saturation weight SW, the value weight VW, and the hue weight HW and the value compensation value VCV based on the value value VV of the input image data IMG (S500).

The driving controller 200 may determine the saturation compensation value SCV based on the saturation value SV, the saturation weight SW, the value weight VW, and the hue weight HW. When the saturation compensation value SCV is linearly compensated according to the saturation value SV as shown in FIG. 6A, saturation value SV may be saturated with a saturation limit value. Therefore, the saturation compensation value SCV may be compensated non-linearly according to the saturation value SV, as shown in FIG. 6B.

The saturation compensation value SCV may increase as the saturation value SV increases. The saturation compensation value SCV may be determined by Equation 1 as shown in FIG. 7 and as provided below.

$$SCV = SV + (SW * VW * HW) * (SV - SV^2) \quad (1)$$

where SCV is the saturation compensation value, SV is the saturation value, SW is the saturation weight, VW is the value weight, and HW is the hue weight. In an embodiment, Equation 1 may be modified using a lookup table. In an embodiment, the saturation weight SW, the value weight VW, and the hue weight HW may vary depending on the type of the image.

Referring to FIG. 8, the driving controller 200 may determine the value compensation value VCV based on the value value VV and the set value K. The value compensation value VCV may increase as the value value VV increases. The value compensation value VCV may be determined by Equation 2 provided below.

$$VCV = VV*(K*VV+1) \quad (2)$$

where VCV is the value compensation value, VV is the value value, and K is the set value. In one embodiment, set value K may be a number greater than −1 and less than 0. As the set value K approaches −1, the value compensation value VCV may decrease overall and the display device 10 may reduce the power consumption. In an embodiment, the set value K may be a predetermined value. Therefore, the value compensation value VCV may be less than the value value VV, and the power consumption of the display device 10 may be reduced.

In an embodiment, the driving controller 200 may determine the saturation compensation value SCV based on the saturation value SV and the saturation weight SW. In an embodiment, the driving controller 200 may determine the saturation compensation value SCV based on the saturation value SV and the value weight VW. In an embodiment, the driving controller 200 may determine the saturation compensation value SCV based on the saturation value SV and the hue weight HW.

The driving controller 200 may convert the input image data IMG from the format of the HSV data to a format of the RGB data.

The driving controller 200 may output the data signal DATA based on the saturation compensation value SCV and the value compensation value VCV.

As such, the display device 10 may divide the display panel 100 into the skin region and the non-skin region based on the input image data IMG, calculate the saturation weight SW of the skin region and the saturation weight SW of the non-skin region, calculate the value weight VW and the hue weight HW based on the input image data IMG, and determine the saturation compensation value SCV based on the saturation value SV of the input image data IMG, the saturation weight SW, the value weight VW, and the hue weight HW and the value compensation value VCV based on the value value VV of the input image data IMG.

Therefore, as the value compensation value VCV decreases, the saturation compensation value SCV increases. For example, when the display device 10 decreases the luminance (e.g., by reducing a data voltage) while increasing the saturation, the visual luminance may be maintained. Accordingly, the display device 10 may reduce the power consumption while maintaining the visual luminance. Additionally, the saturation weight SW may be determined based on the saturation value SV, the value weight VW may be determined based on the value value VV, and the hue weight HW may be determined based on the hue value HV, so that unnaturalness of the image displayed on the display panel 100 may be reduced or minimized.

Figure 9:
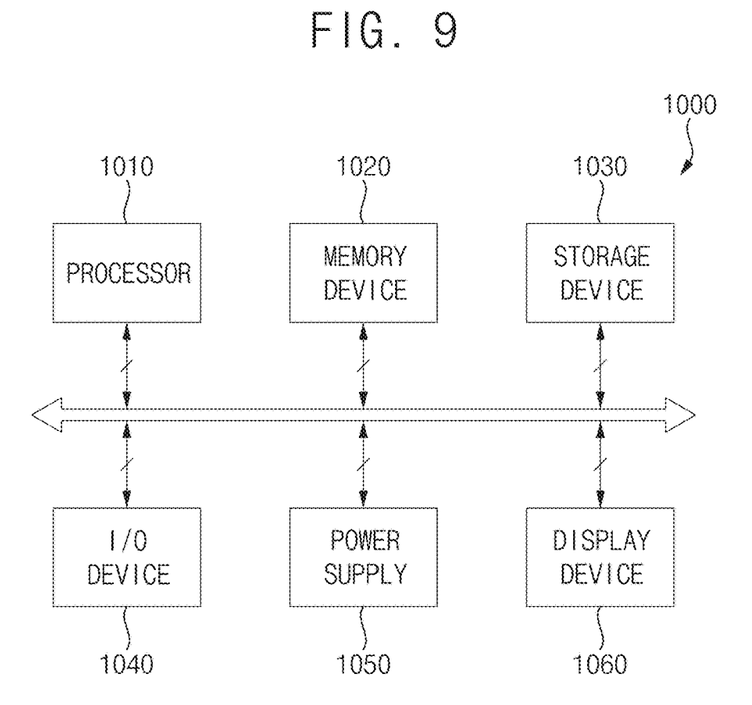
FIG. 9 is a block diagram illustrating an embodiment of an electronic device.
Figure 10:
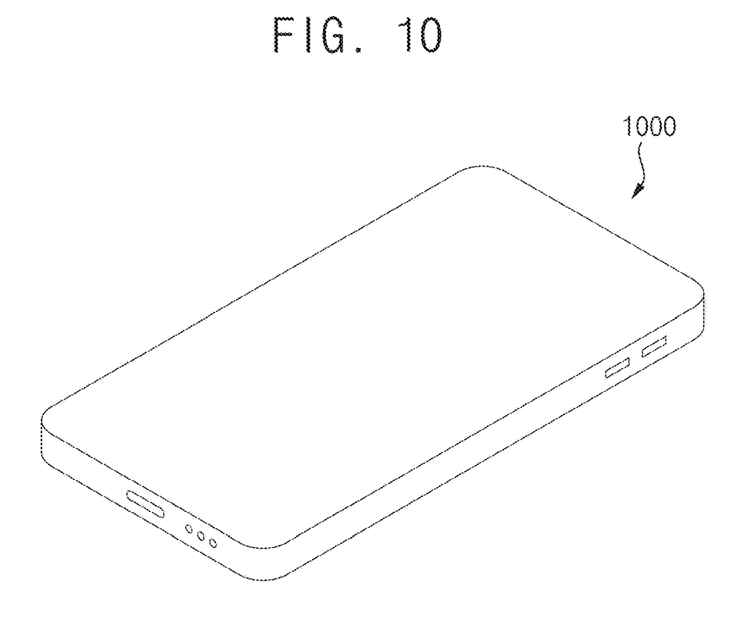
FIG. 10 is a diagram illustrating an embodiment in which the electronic device of FIG. 9 is implemented as a smart phone device.

FIG. 9 is a block diagram illustrating an embodiment of an electronic device 1000, and FIG. 10 is a diagram illustrating an embodiment in which the electronic device 1000 of FIG. 9 is implemented as a smart phone device.

Referring to FIGS. 9 and 10, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 10, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for performing operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. The embodiments may be combined to form additional embodiments.

Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims.

What is claimed is:

1. A display device comprising:
a display panel including pixels;
a driving controller configured to receive input image data for the display panel, to divide the display panel into a skin region and a non-skin region different from the skin region based on the input image data, to calculate a saturation weight comprising a skin region component and a non-skin region component, to calculate a brightness weight and a hue weight based on the input image data, to determine a saturation compensation value based on a saturation value of the input image data, the saturation weight, the brightness weight, and the hue weight and to determine a brightness compensation value based on a brightness value of the input image data, and to compensate for the input image data based on the saturation compensation value and the brightness compensation value to output a data signal; and
a data driver configured to provide a data voltage to a pixel based on the data signal,
wherein the brightness weight is determined based on the brightness value,
wherein when the brightness value is less than a fourth reference value, the brightness weight increases as the brightness value increases, and
wherein when the brightness value is greater than or equal to the fourth reference value, the brightness weight decreases as the brightness value increases.

2. The display device of claim 1, wherein, when the brightness compensation value decreases, the saturation compensation value increases.

3. The display device of claim 1, wherein the driving controller is configured to convert the input image data into a format of Hue, Saturation and Value (HSV) data or equivalently Hue, Saturation and Brightness (HSB) data and to compensate for the input image data based on the format of the HSV data.

4. The display device of claim 1, wherein the display panel is divided into the skin region and the non-skin region based on the saturation value, the brightness value, and a hue value of the input image data.

5. The display device of claim 1, wherein the saturation weight is determined based on the saturation value.

6. The display device of claim 5, wherein,
when the saturation value is less than a first reference value, the saturation weight increases as the saturation value increases, and
when the saturation value is greater than or equal to the first reference value, the saturation weight decreases as the saturation value increases.

7. The display device of claim 1, wherein the skin region component of the saturation weight is less than the non-skin region component of the saturation weight.

8. The display device of claim 1, wherein the hue weight is determined based on a hue value of the input image data.

9. The display device of claim 8, wherein,
when the hue value is less than a second reference value, the hue weight increases as the hue value increases,
when the hue value is greater than or equal to the second reference value and less than a third reference value, the hue weight is constant, and
when the hue value is greater than or equal to the third reference value, the hue weight decreases as the hue value increases.

10. The display device of claim 1, wherein the saturation compensation value increases as the saturation value increases.

11. The display device of claim 1, wherein the saturation compensation value is determined based on the following equation:

$$SCV = SV + (SW * VW * HW) * (SV - SV^2),$$

where SCV is the saturation compensation value, SV is the saturation value, SW is the saturation weight, VW is the brightness weight, and HW is the hue weight.

12. The display device of claim 1, wherein the brightness compensation value increases as the brightness value increases.

13. The display device of claim 1, wherein the brightness compensation value is determined based on the following equation:

$$VCV = VV * (K * VV + 1),$$

where, VCV is the brightness compensation value, VV is the brightness value, and K is a set value (where K is a number greater than −1 and less than 0).

14. A method of driving a display device, the method comprising:
dividing a display panel into a skin region and a non-skin region different from the skin region based on input image data;
calculating a saturation weight comprising a skin region component and a non-skin region component;
calculating a brightness weight and a hue weight based on the input image data;
determining a saturation compensation value based on a saturation value of the input image data, the saturation weight, the brightness weight, and the hue weight, and determining a brightness compensation value based on a brightness value of the input image data; and
outputting a data signal based on the saturation compensation value and the brightness compensation value,
wherein the brightness weight is determined based on the brightness value,
wherein when the brightness value is less than a fourth reference value, the brightness weight increases as the brightness value increases, and
wherein when the brightness value is greater than or equal to the fourth reference value, the brightness weight decreases as the brightness value increases.

15. The method of claim 14, wherein, when the brightness compensation value decreases, the saturation compensation value increases.

16. The method of claim 14, further comprising converting the input image data from a format of Red, Green and Blue (RGB) data into a format of Hue, Saturation and Value (HSV) data or equivalently Hue, Saturation and Brightness (HSB) data.

17. The method of claim 14, wherein the display panel is divided into the skin region and the non-skin region based on the saturation value, the brightness value, and a hue value of the input image data.

18. The method of claim 14, wherein the saturation weight comprising the skin region component and the non-skin region component is determined based on the saturation value.

19. A method for controlling a display-device comprising:
reducing a data voltage of a pixel of a display panel, the reduced data voltage producing a reduction in luminance of an image generated by the display panel; and
increasing saturation of the display panel to offset the reduction in luminance, wherein the saturation of the display panel is increased by an amount sufficient to maintain a constant visual luminance,
wherein increasing the saturation of the display panel includes determining a saturation compensation value based on a saturation value of input image data, a saturation weight, a brightness weight, and a hue weight,
wherein the saturation compensation value is determined based on the following equation:

$$SCV=SV+(SW*VW*HW)*(SV-SV^2),$$

where SCV is the saturation compensation value, SV is the saturation value, SW is the saturation weight, VW is the brightness weight, and HW is the hue weight.

20. The method of claim 19,
wherein reducing the data voltage of the pixel of the display panel includes determining a brightness compensation value based on a brightness value of the input image data,
wherein the brightness compensation value is determined based on the following equation:

$$VCV=VV*(K*VV+1),$$

where VCV is the brightness compensation value, VV is the brightness value, and K is a set value (where K is a number greater than −1 and less than 0).

* * * * *